UNITED STATES PATENT OFFICE.

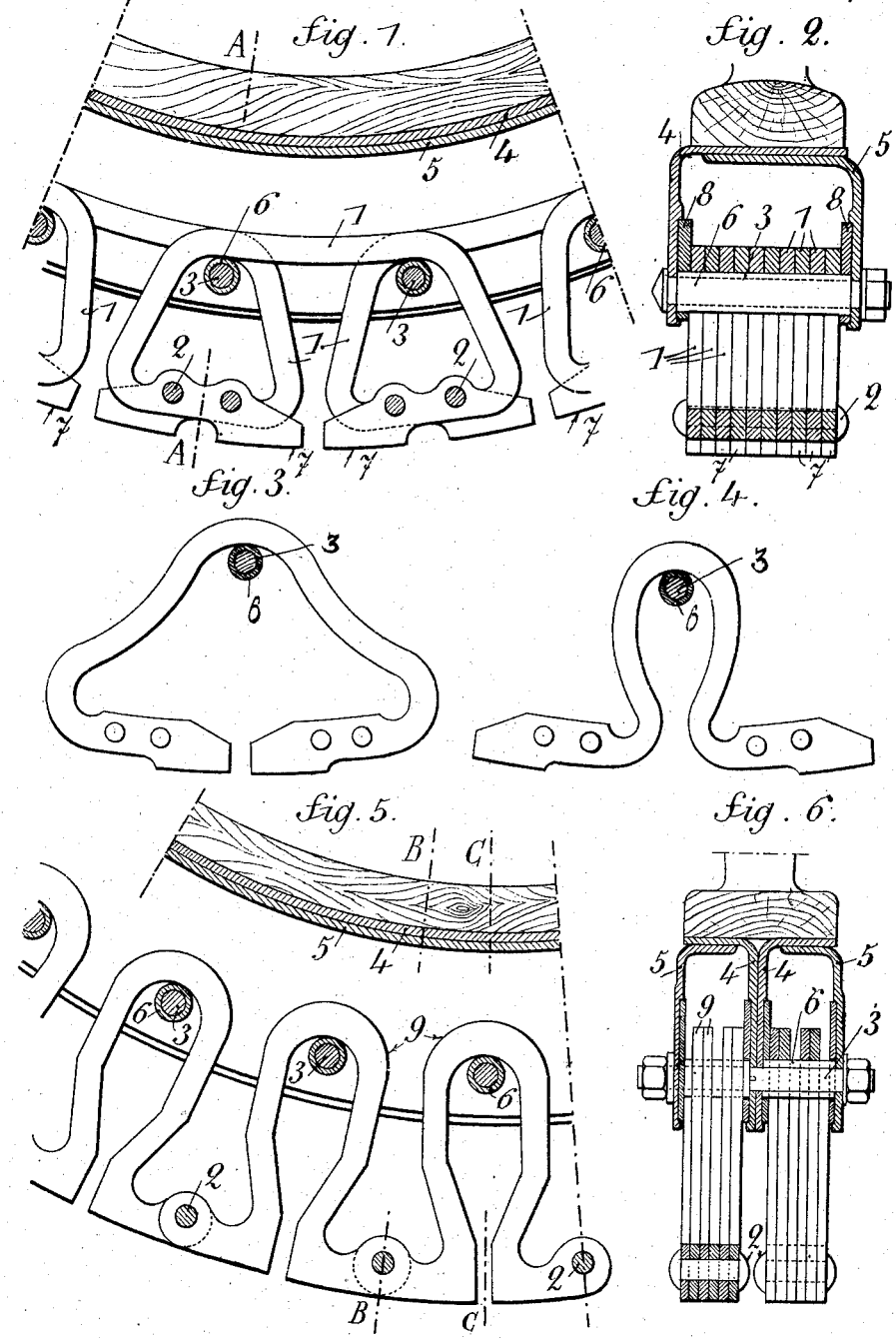

GEORGETTE BARDET, OF PARIS, FRANCE.

ELASTIC WHEEL-TIRE.

No. 907,307. Specification of Letters Patent. Patented Dec. 22, 1908.

Application filed March 25, 1907. Serial No. 364,431.

*To all whom it may concern:*

Be it known that I, GEORGETTE BARDET, *née* BON, a citizen of the Republic of France, residing at Paris, 58 Boulevard Voltaire, France, independent lady, have invented certain new and useful Improvements in an Elastic Wheel-Tire, of which the following is a specification.

My invention relates to an elastic wheel tire which consists of an undulating spring surrounding the whole wheel rim and placed at a certain distance therefrom, each part of this spring being free to bend in a radial direction, but being prevented from being displaced in the direction of the circumference by projections on the rim or by bolts, or other means. This arrangement has the effect of making a large portion of the undulating spring—say a third of the circumference of the wheel—support the load, this portion working in the manner of an elastic arc supported at its ends and loaded at the middle. In the resulting deformation the deflection is accompanied by a compression of the spring in the direction of the circumference, causing its loops to approach and to be locked to one another.

The invention has for object the construction of a tire of this kind in which the undulating elastic ring instead of being made from a single continuous strip is built up from a number of elements assembled in succession, this construction considerably facilitating the making and repairing of the tire.

The accompanying drawing illustrates several forms of tire so constructed.

Figure 1 is a vertical part section of a tire. Fig. 2 is a cross section taken on the line A—A of Fig. 1. Figs. 3 and 4 show elements of undulating rings. Fig. 5 is a part section of another tire. Fig. 6 is a cross section taken partly on the line B—B of Fig. 5 and partly on the line C—C.

The tire shown in Figs. 1 and 2 comprises a large number of elastic C-shaped elements 1 the ends of which are each provided with two holes and connected rigidly together by rivets 2. These elements are arranged alternately so that each end of an element, turned in one direction is connected to the ends of the adjacent elements turned in the opposite direction. This forms a series of loops having the compressibility desired in a longitudinal or circumferential direction. Through these loops freely pass the bolts 3, fixed to the rim of the wheel which is preferably composed of two lateral L-shaped rings 4, 5 kept at the required distance apart by distance tubes 6 surrounding the bolts 3.

With the object of obtaining a non-skidding surface suitable projections or heels 7 are formed on the ends of the elements. Washers 8, of leather, fiber or other material may be placed between the lateral elements and the sides of the rim to avoid noise when the tire is running.

Fig. 3 shows an element also C-shaped, but approaching the shape of a triangle, whereas the elements of Fig. 1 approach the shape of a trapezoid. With this shape, a single bolt 3 is placed in each element instead of two. The element shown in Fig. 4 is also C-shaped but more flattened and having its ends turned outwards and lengthened. In this case as well, a single bolt is passed through the element. Among these shapes, that shown in Fig. 1 is of the greatest advantage because there is a great space for the play of the bolts 3, with an equal height of spring. It must be understood that these shapes are not exclusive. For example, each element may have two or more undulations or loops. In Figs. 5 and 6 each element has two loops 9, each of its ends is riveted to the middle of an adjacent element and the opposite end of another adjacent element; moreover its center is riveted to the ends of two adjacent elements.

Instead of placing all the series of elastic elements side by side as shown in Fig. 2, they may be separated into two or more groups as shown in Fig. 6. In this last form, each group is mounted between two rings 4 and 5, kept at the required distance apart as above described.

I would observe that instead of riveting the elements together, they may be securely connected together by some other means, in a dismountable manner or otherwise.

Claims—

1. A resilient tire comprising a hollow rim, elastic elements arranged within said rim and each having loop-like members arranged in parallel circular rows, the members of one row alternating with those of the adjacent row and fixed rigidly thereto to provide a ring formed of open buckle-like members, and bolts passing freely into the members of said ring.

2. In combination with a vehicle wheel having a rim U-shaped in cross section, of an elastic vehicle tire comprising an undulating resilient ring arranged within said rim and composed of a plurality of approximately C-shaped plates with their convex sides turned toward the rim, said plates being arranged to form a series of parallel rows, with the plates of one row disposed in staggered relation to those of the adjacent rows, and the plates of adjacent rows being rigidly connected together, and fastening devices passed through said rim and the loops of said ring.

In testimony, that I claim the foregoing as my invention, I have signed my name in presence of two subscribing witnesses.

GEORGETTE BARDET.

Witnesses:
JEAN BANTET,
MAURICE ROUX.